(12) United States Patent
Kozlovski

(10) Patent No.: US 7,387,518 B2
(45) Date of Patent: Jun. 17, 2008

(54) GROUNDING ATTACHMENT ASSEMBLY

(75) Inventor: Albert David Kozlovski, Atkinson, NH (US)

(73) Assignee: M/A-COM, Inc., Lowell, MA (US)

( * ) Notice: Subject to any disclaimer, the term of this patent is extended or adjusted under 35 U.S.C. 154(b) by 95 days.

(21) Appl. No.: 11/317,563

(22) Filed: Dec. 23, 2005

(65) Prior Publication Data

US 2007/0145226 A1    Jun. 28, 2007

(51) Int. Cl.
*H01R 13/648* (2006.01)
(52) U.S. Cl. ....................................... 439/92
(58) Field of Classification Search .................. 439/92, 439/94
See application file for complete search history.

(56) References Cited

U.S. PATENT DOCUMENTS

| | | | |
|---|---|---|---|
| 6,231,352 B1 * | 5/2001 | Gonzales | 439/66 |
| 6,399,887 B1 * | 6/2002 | Lin | 174/138 D |
| 6,431,885 B1 * | 8/2002 | Stroup | 439/94 |
| 6,609,914 B2 * | 8/2003 | Dibene, II | 439/74 |
| 6,762,727 B2 | 7/2004 | Rochford et al. | |
| 6,879,301 B2 | 4/2005 | Kozlovski | |
| 2002/0016092 A1 | 2/2002 | Dibene, II | |
| 2003/0067182 A1 | 4/2003 | Rochford et al. | |
| 2003/0068198 A1 | 4/2003 | Kozlovski | |
| 2003/0197649 A1 | 10/2003 | Kozlovski | |
| 2006/0172576 A1 * | 8/2006 | Vermoesen et al. | 439/271 |

FOREIGN PATENT DOCUMENTS

| | | |
|---|---|---|
| DE | 10 2004 037 813 B3 | 10/2005 |
| FR | 1 162 196 | 9/1958 |
| FR | 2 563 946 | 11/1985 |

* cited by examiner

*Primary Examiner*—T C Patel
*Assistant Examiner*—Phuong Nguyen

(57) ABSTRACT

An attachment assembly and method for attachment are provided. The attachment assembly includes a base having a shaft extending therefrom and a non-conductive compression member having a plurality of slots and configured to engage the shaft. The attachment assembly further includes a locking component configured to engage the shaft. The locking component has a plurality of resilient extensions configured to engage the plurality of slots of the compression member. The locking component is configured to compress the compression member in a tightened state and wherein the resilient extensions form a conductive path when in the tightened state.

20 Claims, 9 Drawing Sheets

GROUNDING ATTACHMENT ASSEMBLY

BACKGROUND OF THE INVENTION

This invention relates generally to attachment devices, and more particularly, to an attachment assembly for panel mounting, especially for mounting to sheet metal panels.

Different types of attachment methods and mechanisms may be used to attach a device to a panel or other supporting structure. For example, vehicles often include an antenna mounted to the body of the vehicle. This antenna may be, for example, a radio antenna, Global Positioning System (GPS) antenna or cellular antenna. The antenna typically includes an assembly wherein a exterior unit mounts to an outer surface of the vehicle. The assembly may mount to the hood, roof or trunk lid of the vehicle. The assembly typically includes an attachment member that extends into the interior of the vehicle through an opening.

Mounting and installation of assemblies to panels, for example, mounting antenna assemblies to a vehicle panel, is often performed in a confined or small space, such as, in the interior of the vehicle. The individual mounting the assembly also typically uses several tools to hold and attach the assembly to a panel or support. The mounting of the assembly, in some instances, may require more than one person or multiple hands, for example, if the assembly is not self-contained or includes multiples parts. Further, when mounting assemblies in large numbers, for example, on an assembly line, any delay, difficulty or extra time to mount the assembly, results in added cost. Thus, if there is difficulty in quickly and accurately mounting these assemblies, the cost of such installation will increase. Additionally, improper mounting that does not form a sealing engagement can result in contamination to the assembly, for example, water and dirt may enter the assembly. Further, additional operational steps, for example, to assemble multiple parts or properly orient the assembly relative to the panel, can again result in increased time and cost for installation.

Known attachment mechanisms and assemblies typically involve the use of one or more hands or multiple individuals. For example, the fastening portion and the housing portion of the assembly may be located on different sides of a panel. Additionally, the use of many components results in added complexity and time of installation, as well as increased likelihood of improper installation, that may lead to failure of the installation (e.g., water leak). Further, it is known to use gaskets with the attachment mechanisms to seal the surface of the panel with the assembly. Often the force required to provide engagement of the gasket to, for example, a surface of a panel results in distortion of the surface, thereby increasing the likelihood of providing an improper seal. Thus, the attachment members (and associated components) are often dimensionally sensitive to hole size variation, installation forces and distortion of, for example, sheet metal, during installation.

BRIEF DESCRIPTION OF THE INVENTION

In an exemplary embodiment, an attachment assembly is provided that includes a base having a shaft extending therefrom and a non-conductive compression member having a plurality of slots and configured to engage the shaft. The attachment assembly further includes a locking component configured to engage the shaft. The locking component has a plurality of resilient extensions configured to engage the plurality of slots of the compression member. The locking component is configured to compress the compression member in a tightened state and wherein the resilient extensions form a conductive path when in the tightened state.

In another exemplary embodiment, a compression device is provided that includes an elastomer body and a plurality of axial slots along an outer surface of the elastomer body. The plurality of axial slots are configured to receive therein resilient fingers of a locking device. The elastomer body is configured to be compressed to engage with a surface and the plurality of axial slots are configured to provide a conductive path with the resilient fingers when the elastomer body is compressed.

In still another exemplary embodiment, a method of attaching a device to a surface having an opening is provided. The method includes configuring a compression member to compress and engage with the opening of the surface. The method further includes configuring a locking component to compress the compression member in a tightened state and provide a conductive path with a plurality of resilient extensions of the locking component.

DETAILED DESCRIPTION OF THE INVENTION

Figure 1:
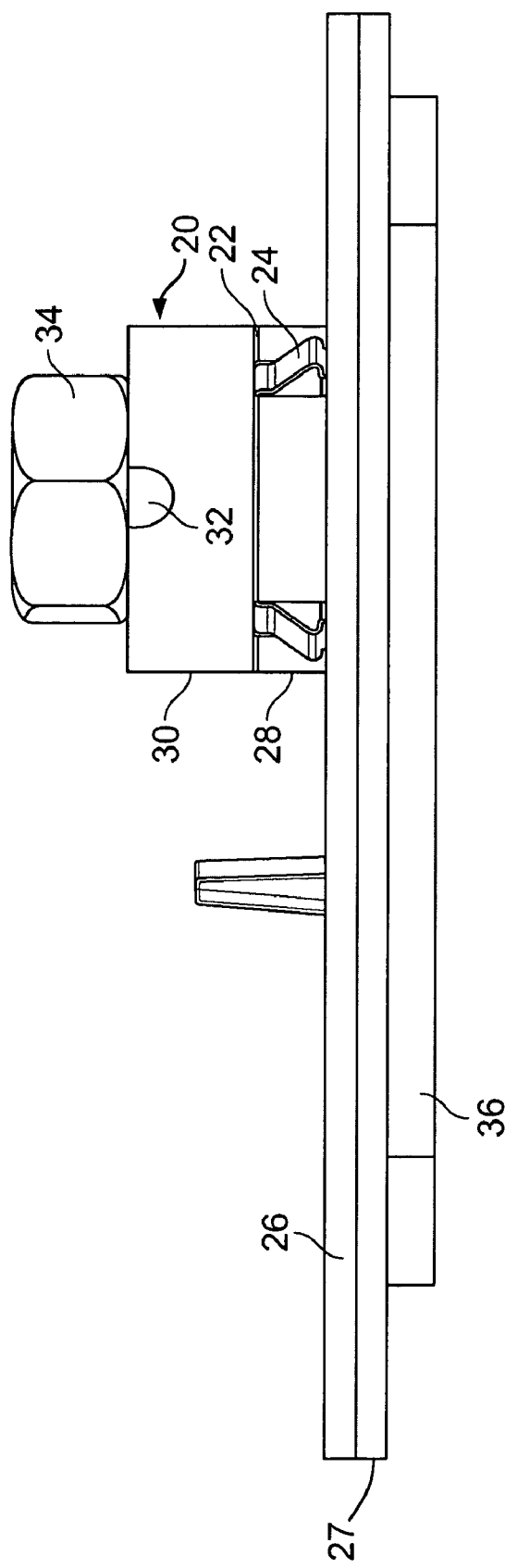
FIG. 1 is a side view of an attachment assembly constructed in accordance with an embodiment of the invention attached to a panel.
Figure 2:
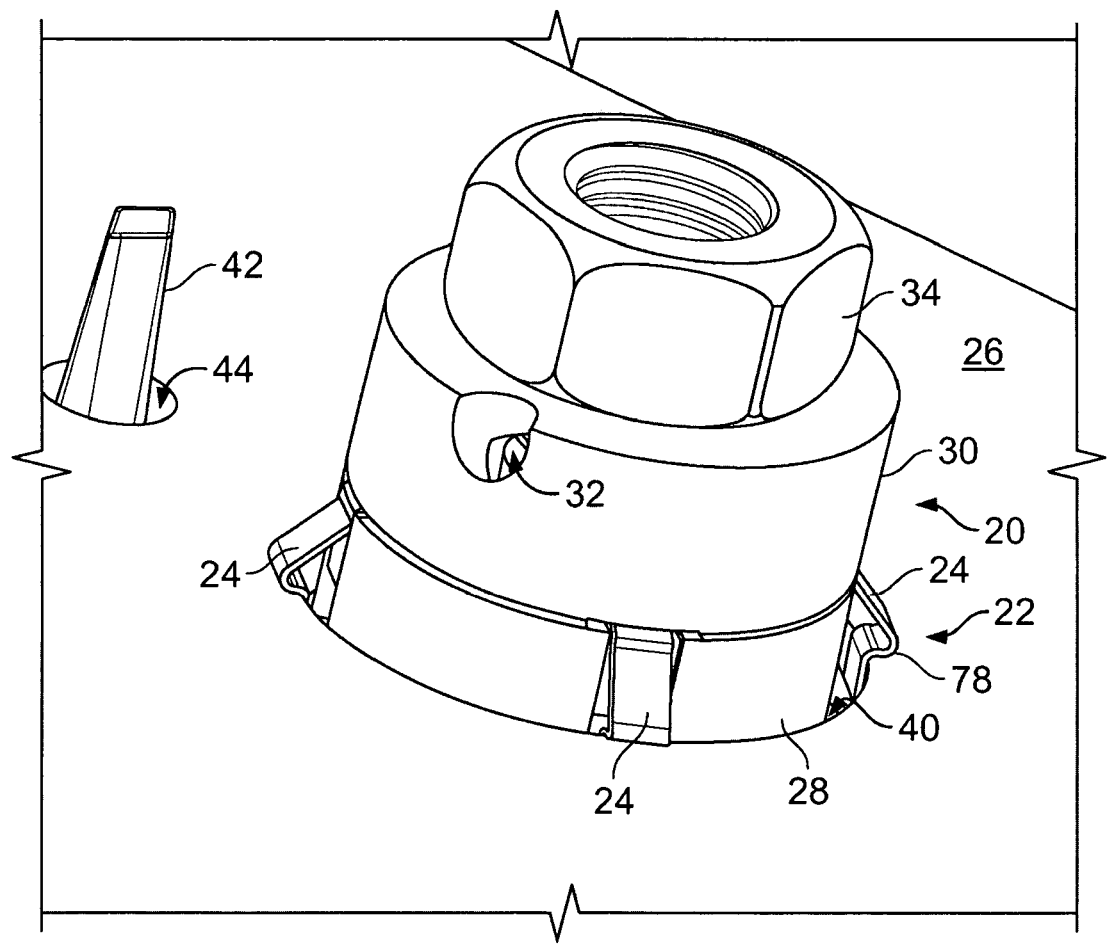
FIG. 2 is a top perspective view of an attachment assembly constructed in accordance with an embodiment of the invention attached to a panel.
Figure 3:
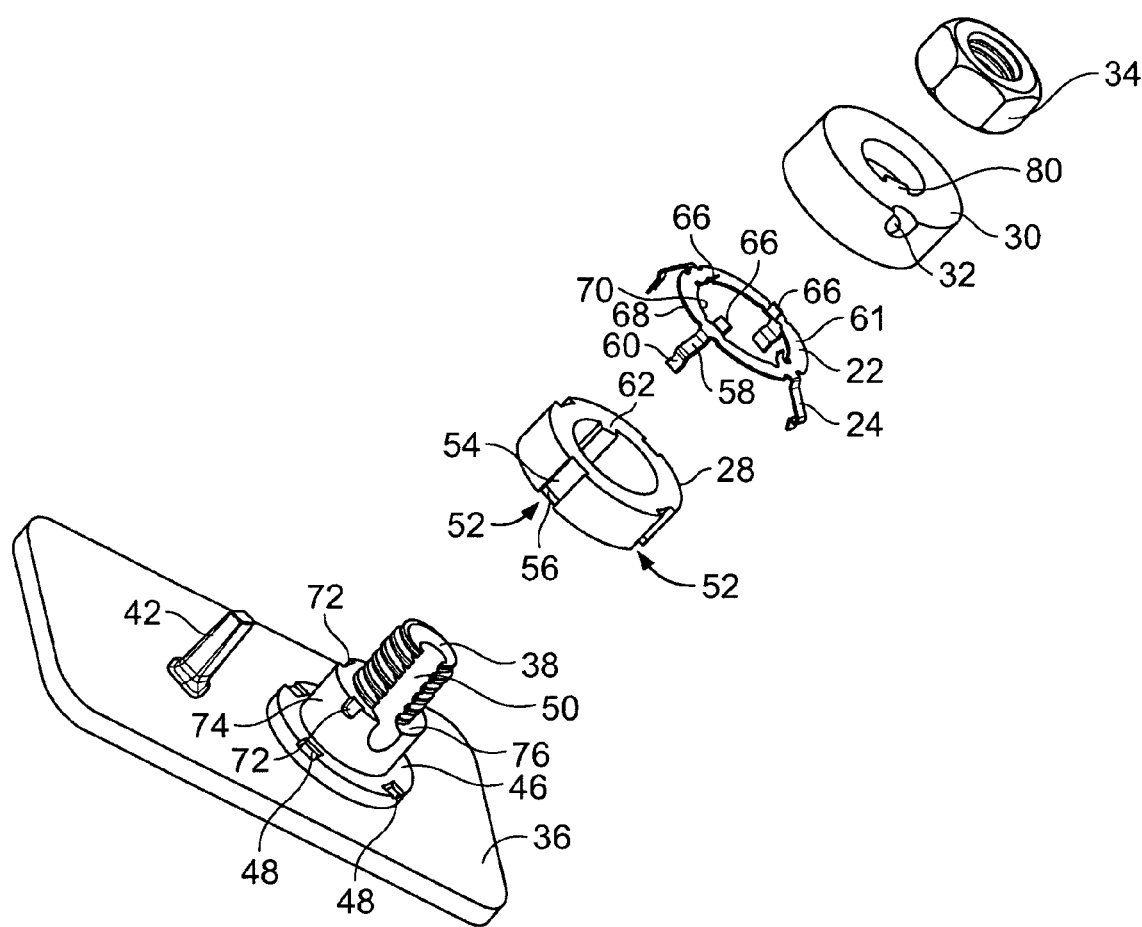
FIG. 3 is an exploded view of the attachment assembly of FIGS. 1 and 2.
Figure 4:
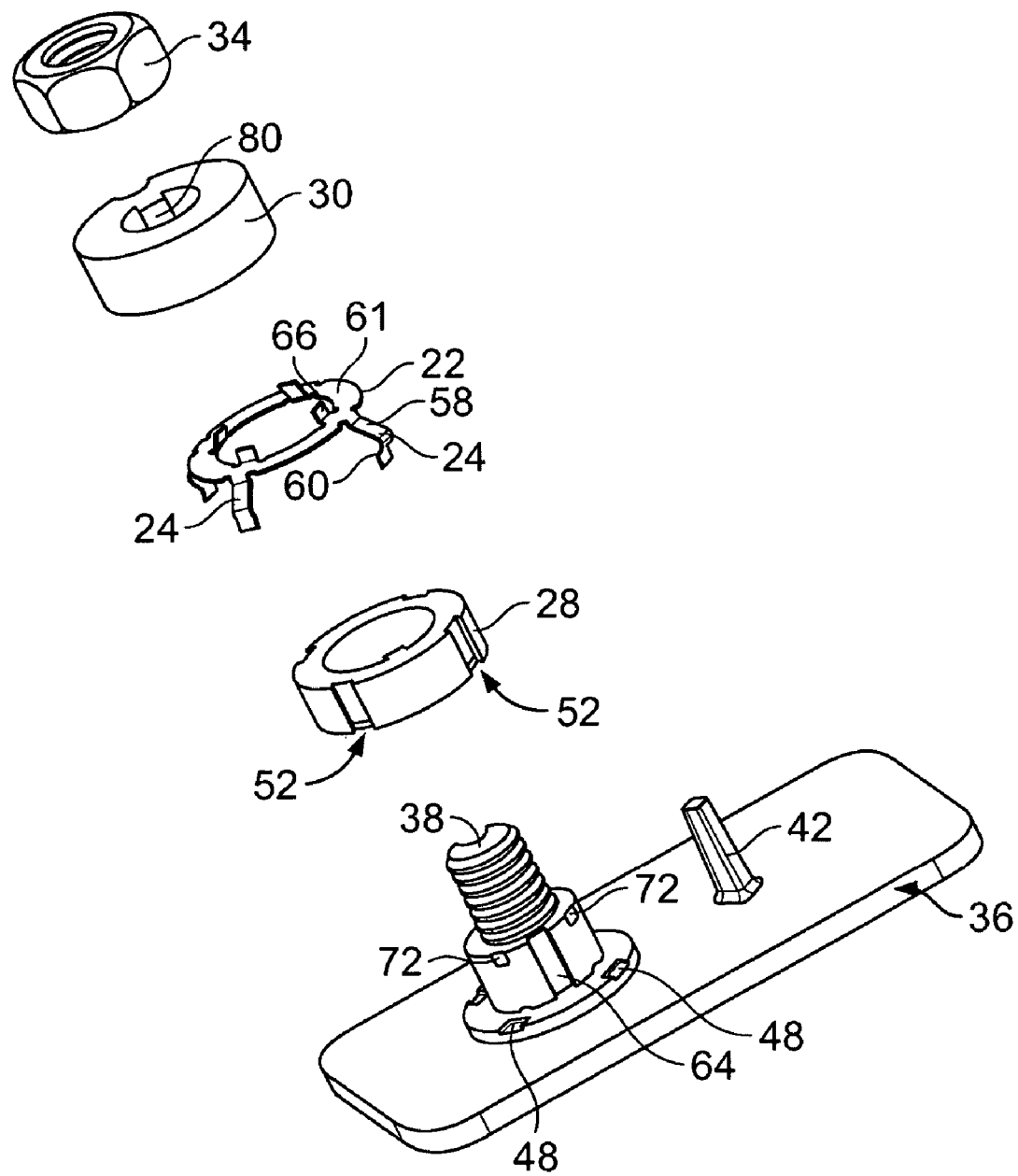
FIG. 4 is another exploded view of the attachment assembly of FIGS. 1 and 2.
Figure 5:
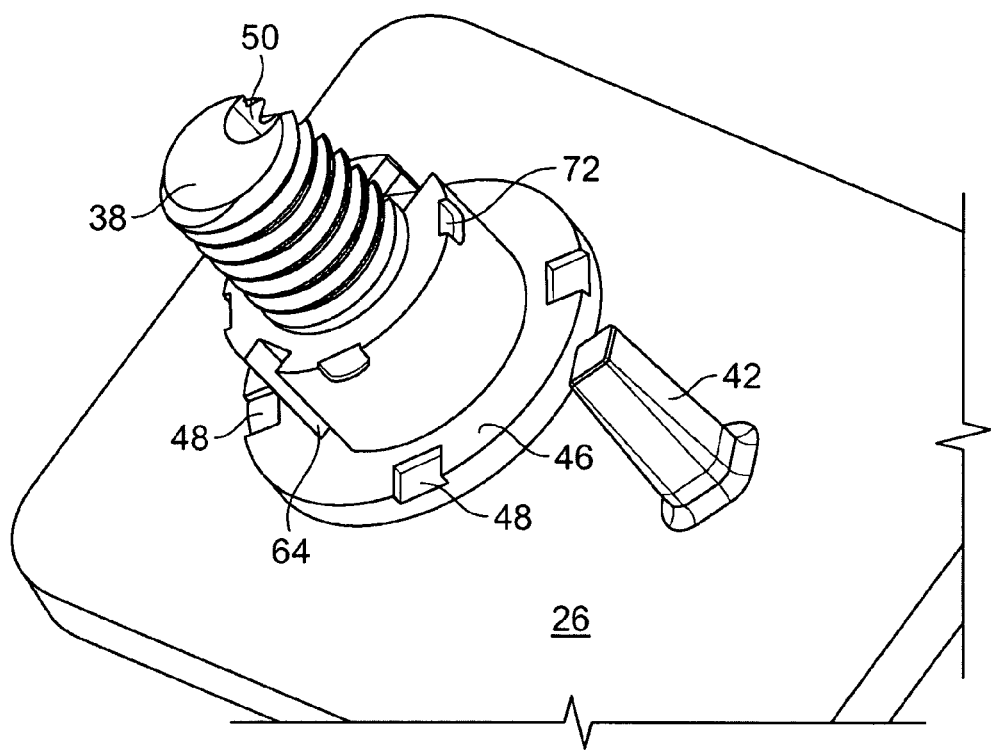
FIG. 5 is a top perspective view showing a base of the attachment assembly of FIGS. 1 and 2.
Figure 6:
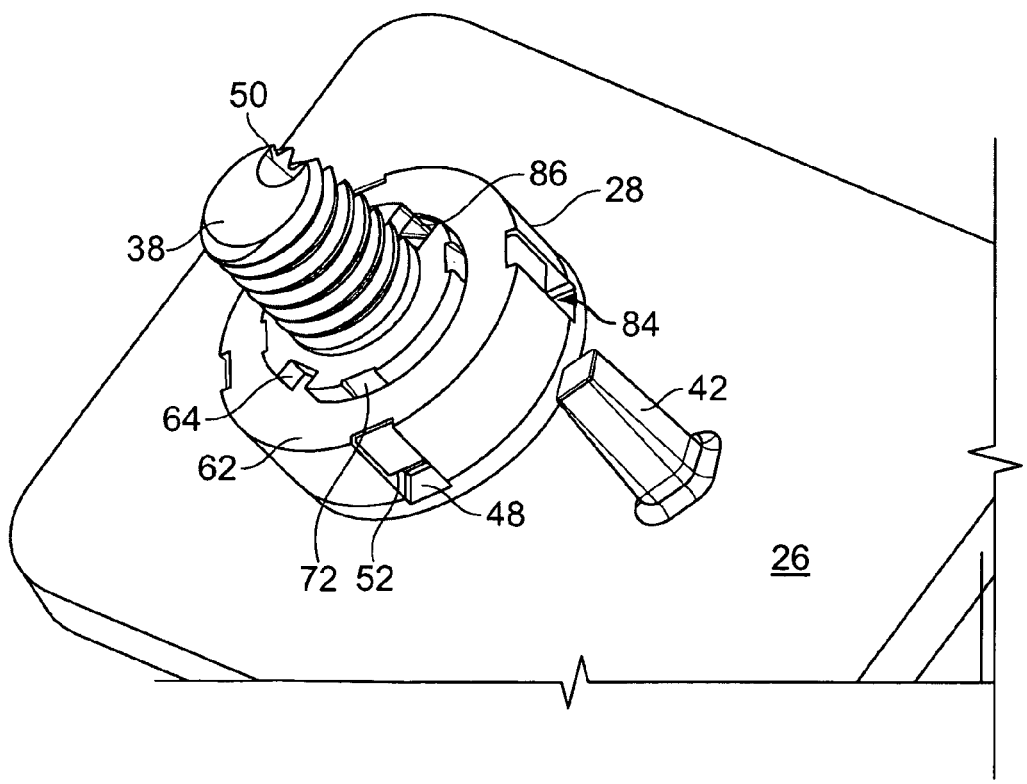
FIG. 6 is a top perspective view showing a base and a compression member of the attachment assembly of FIGS. 1 and 2.
Figure 7:
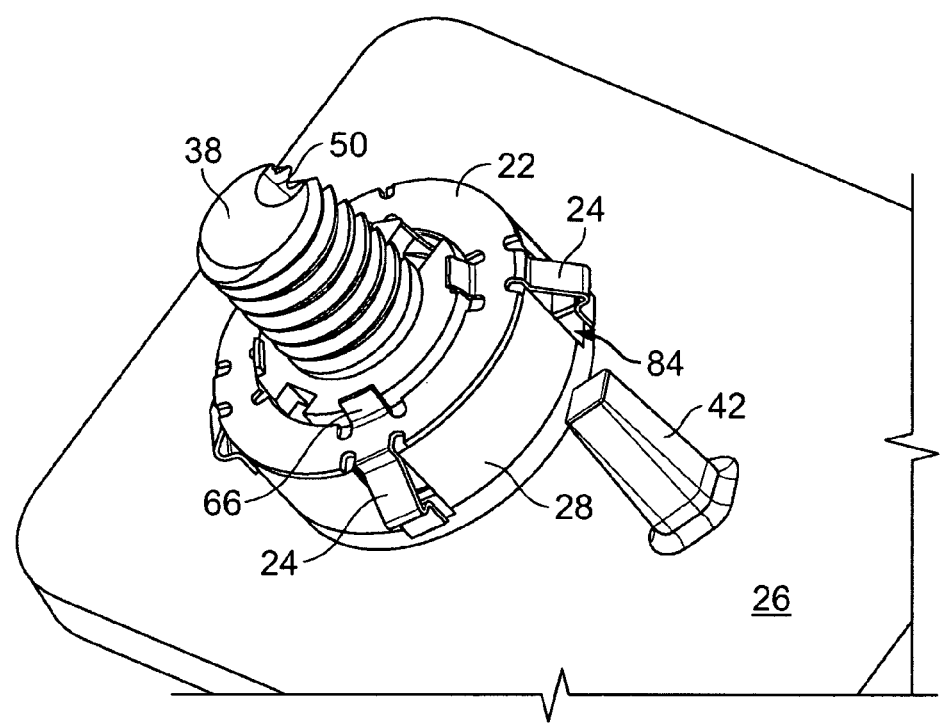
FIG. 7 is a top perspective view showing a base, compression member and locking component of the attachment assembly of FIGS. 1 and 2.
Figure 8:
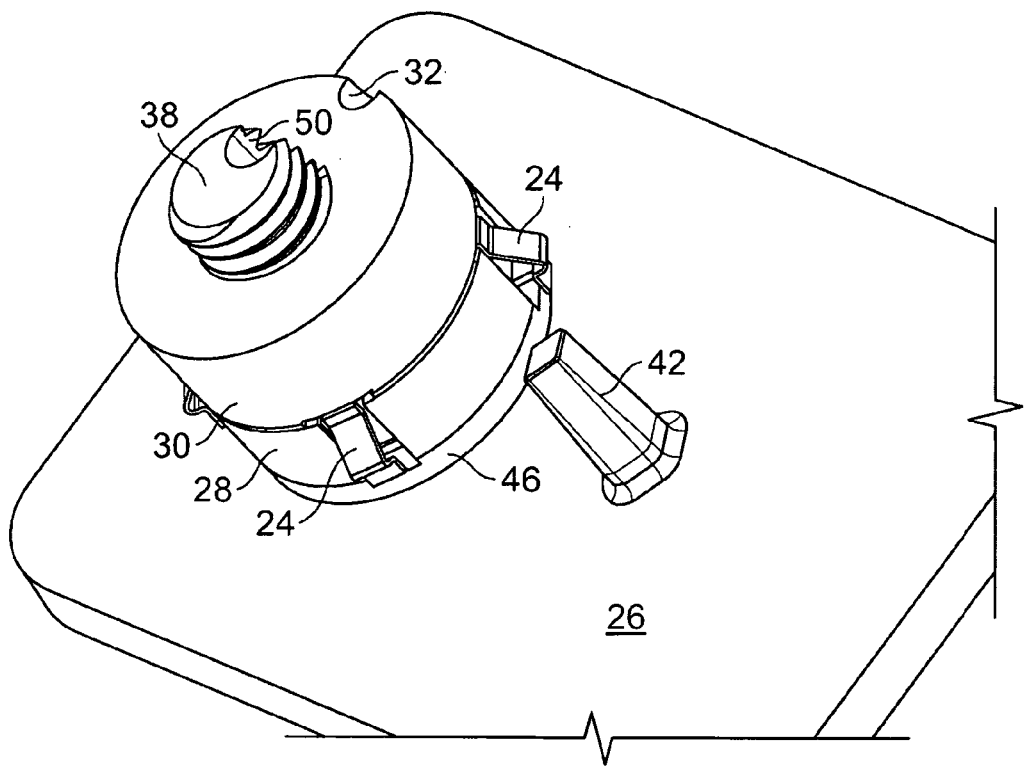
FIG. 8 is a top perspective view showing a base, compression member, locking component and clamp of the attachment assembly of FIGS. 1 and 2.
Figure 9:
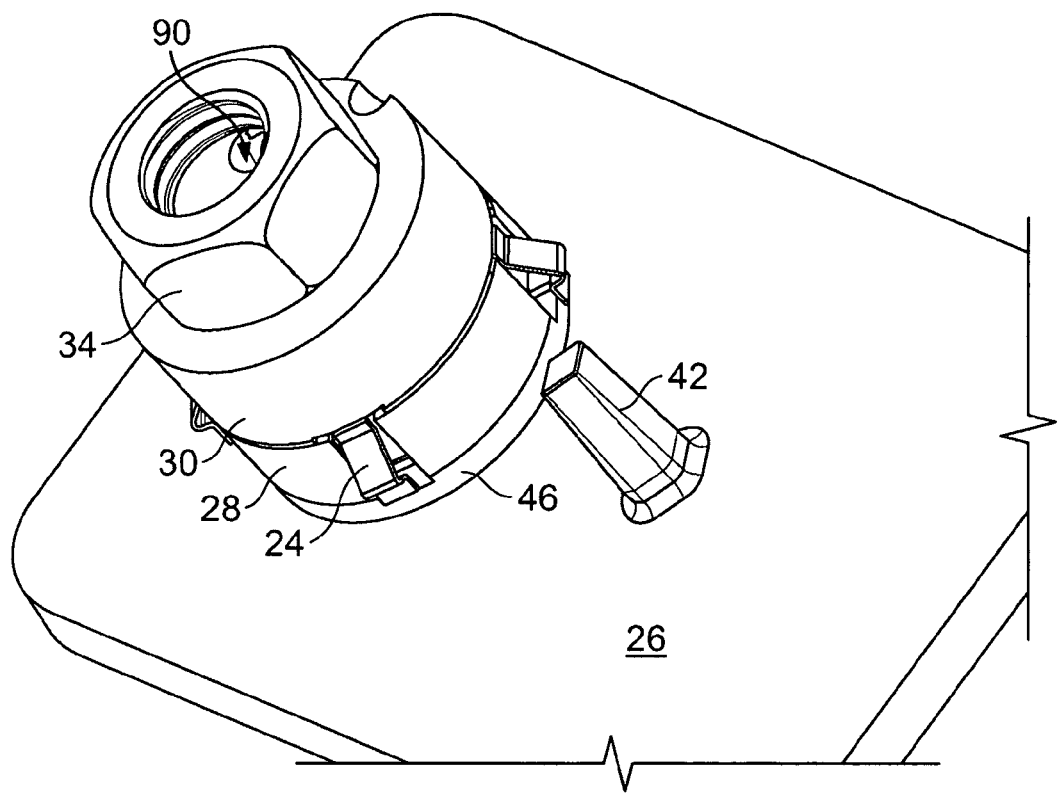
FIG. 9 is a top perspective view showing a base, compression member, locking component, clamp and nut of the attachment assembly of FIGS. 1 and 2.

Various embodiments of the present invention provide an attachment assembly allowing a user to install an object, for example, an antenna, to a surface, such as, a surface of a sheet metal panel. However, the various embodiments are not limited to an antenna application, and may be implemented in connection with mounting any device to any surface. In particular, and as shown in FIGS. 1 through 4, various embodiments of the invention provide an attachment assembly 20, for example, an antenna attachment assembly for use with an antenna unit (not shown). The attachment assembly 20 includes a locking component 22 having a plurality of resilient extensions 24, which are generally configured as resilient fingers or arms. The locking component 22 is configured to maintain the position of the attachment assembly 20 to a panel 26, for example, a sheet metal panel during installation. The locking component 22 is further configured to engage a compression member 28, which in an exemplary embodiment, is formed of an elastomer or other non-rigid and/or non-conductive material, such as, for example, rubber. The locking component 22 is also configured to be positioned between the compression member 28 and a clamp 30. The clamp 30, in various embodiments, is a dielectric member, for example, a rigid molded dielectric piece that seats against the locking component 22. The clamp 30 includes an opening 32 configured to receive therethrough, wires, cables, or other elements extending from one side of the panel 26 to the other side of the panel 26 (e.g., from inside the panel 26 to outside the panel 26).

A retaining member, for example, a nut 34 or similar component is configured to secure the various components of the attachment assembly 20 to the panel 26, and more particularly, to secure a base 36 to the panel 26. In an exemplary embodiment, a gasket 27 is provided between the base 36 and the panel 26. The base 36 may be configured to be connected to another device or component, or may be integrally formed with another device or component. The base 36, in an exemplary embodiment, is configured having a generally planar plate with a shaft 38 extending therefrom and configured to extend through an opening 40 of the panel 26. The shaft 38 is externally threaded to engage internal threadings of the nut 34. The shaft 38 also includes a groove or slot 50 extending longitudinally along the shaft 38, and in particular an external surface of the shaft 38, for receiving therethrough cables, wires, etc.

The base 36 also optionally includes a post 42 configured to extend through an opening 44 of the panel 26 and prevent rotation of the base 36 relative to the panel 26. The base 36 further includes a mounting portion 46 defining a generally circular raised portion at the base of the shaft 38. The mounting portion 46 includes a plurality of recessed regions 48 about the circumference of the mounting portion 46. The mounting portion 46 is configured to extend into the opening 40. It should be noted that the number of recessed regions 48 may be varied and generally is same as the number of resilient extensions 24 of the locking component 22.

The compression member 28 generally includes a plurality of longitudinally extending slots 52 (e.g., axial slots) configured to engage the resilient extensions 24 of the locking component 22. The slots 52 are formed on an outer surface of the compression member 28 and include an upper portion 54 configured to engage an upper portion 58 of the resilient extensions 24 and a lower portion 56 configured to engage a lower portion 60 of the resilient extensions 24. The lower portion 56 of the slots 52 have a greater radial depth or depression to receive therein the lower portion 60 of the resilient extensions 24. The compression member 28 also includes a longitudinally extending internal keyed portion or flange 62 for engaging a slot 64 of the shaft 38. The slot 64 in an exemplary embodiment is 180 degrees from the slot 50.

The locking component 22 is formed having an annular or ring-shaped portion 61 with the resilient extensions 24 extending from an outer rim 68 of the locking component 22. The locking component also includes tabs 66 extending from an inner rim 70 of the locking component 22. The tabs 66 are configured as interference fit tabs or keyed tabs that engage, and more particularly, align with and fit within indents 72 on the mounting portion 46 and more particularly, on an upper rim 76 of an extension 74 of the mounting portion 46 that forms a portion of the shaft 38. The resilient extensions 24 are configured such that the upper portion 58 extends at an angle from the ring-shaped portion 61 and includes an inwardly extending portion 78 that is substantially at a ninety degree angle relative to the lower portion 60. The inwardly extending portion 78 is configured to be generally perpendicular to the longitudinal axis of the attachment assembly 20 during installation. The lower portions 60 are configured to engage an inner surface of the opening 40 during installation of the attachment assembly 20. The tabs 66 are generally upwardly facing and provide a conductive path as described in more detail herein.

The locking component 22 may be formed of any suitable material to provide a desired or needed resiliency to the resilient extensions 24. In various embodiments, the locking component 22 is formed of a metal material and generally defines a spring clip component for holding the attachment assembly 20 in place during installation.

The clamp 30 includes an internal tab 80 extending inwardly from an inner surface of the clamp 30. The internal tab 80 is configured to engage, and more particularly, align with and fit within the groove 50 of the shaft 38.

In operation, as shown in FIG. 5 through 9, the base 36 is positioned against a panel 26 (shown in FIGS. 1 and 2) with the shaft 38 and post 42 extending through the panel 26. The mounting portion 46 extends into the opening 40 (shown in FIG. 2) and the post 42 extends through the opening 44 (shown in FIG. 2). The base 36 may be formed as a cast part, and may be constructed of any material, such as, for example, steel or zinc, or a composite thereof. The base 36 may be any type of base 36 for mounting a device or assembly to the panel 26, and is not limited to, for example, an antenna mount. The optional post 42 is shaped to prevent rotation of the base 36 relative to the panel 26. It should be noted that cross-sectional shape of the post 42 may be modified as desired or needed, for example to have a polygonal (e.g., hexagonal), circular, oval, rectangular, square and diamond shaped cross-sections, among others. The compression member 28 engages around the extension 74 of the mounting portion 46. In particular, the flange 62 engages the slot 64 to align the compression member 28 relative to the shaft 38, thereby providing a keying arrangement. The recessed regions 48 together with the lower portion 56 of the slots 52 form a receiving opening 84 for receiving therein the lower portion 60 of resilient extensions 24 of the locking component 22. The slot 50 defines a passage 86 for receiving therethrough wires, cables, etc. from, for example, below the base 36.

The locking component 22 then engages, and more particularly, abuts or seats on top of the compression member 28 such that the tabs 66 of the locking component 22 engage the indents 72 of the rim 76 of the extension 74 of the mounting portion 46 to align the locking component 22. In particular, the resilient extensions 24 are aligned relative to the openings 84, and more particularly, the lower portions 60 are aligned relative to the openings 84. It should be noted that the tabs 66 provide an interference or keyed fit that orients the locking component 22 and provides a continuous ground or conductive path through the attachment assembly 20.

The clamp 30 then engages, and more particularly, abuts or seats on top of the locking component 22 such that the internal tab 80 (shown in FIGS. 3 and 4) engages within the grove 50 to align and orient the clamp 30. The clamp 30 may be formed of any rigid material, such as a rigid molded dielectric, and seats against the ring-shaped portion 61. The opening 32 provides a continuous passage from the grove or slot 50 in the extension 74 and shaft 38 for cables, wires, etc. to pass therethrough. Thereafter, the nut 34 engages the shaft 38 such that the internal threadings of the nut 34 engage the external threadings of the shaft 38. It should be noted that the nut 38 has an open upper end to also allow passage therethrough of cable, wires. etc. through an opening 90 formed by the groove 38.

Figure 10:
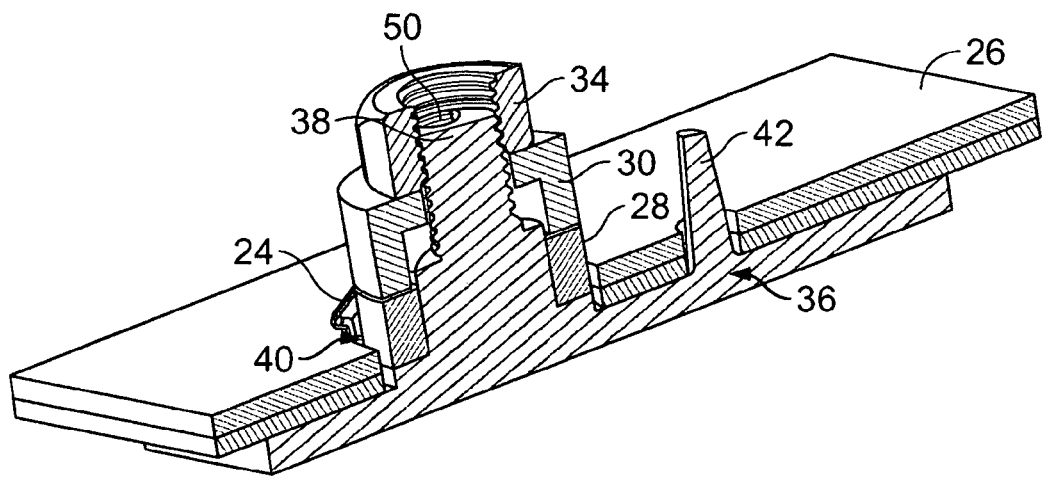
FIG. 10 is a cross-sectional view of the attachment assembly of FIGS. 1 and 2.
Figure 11:
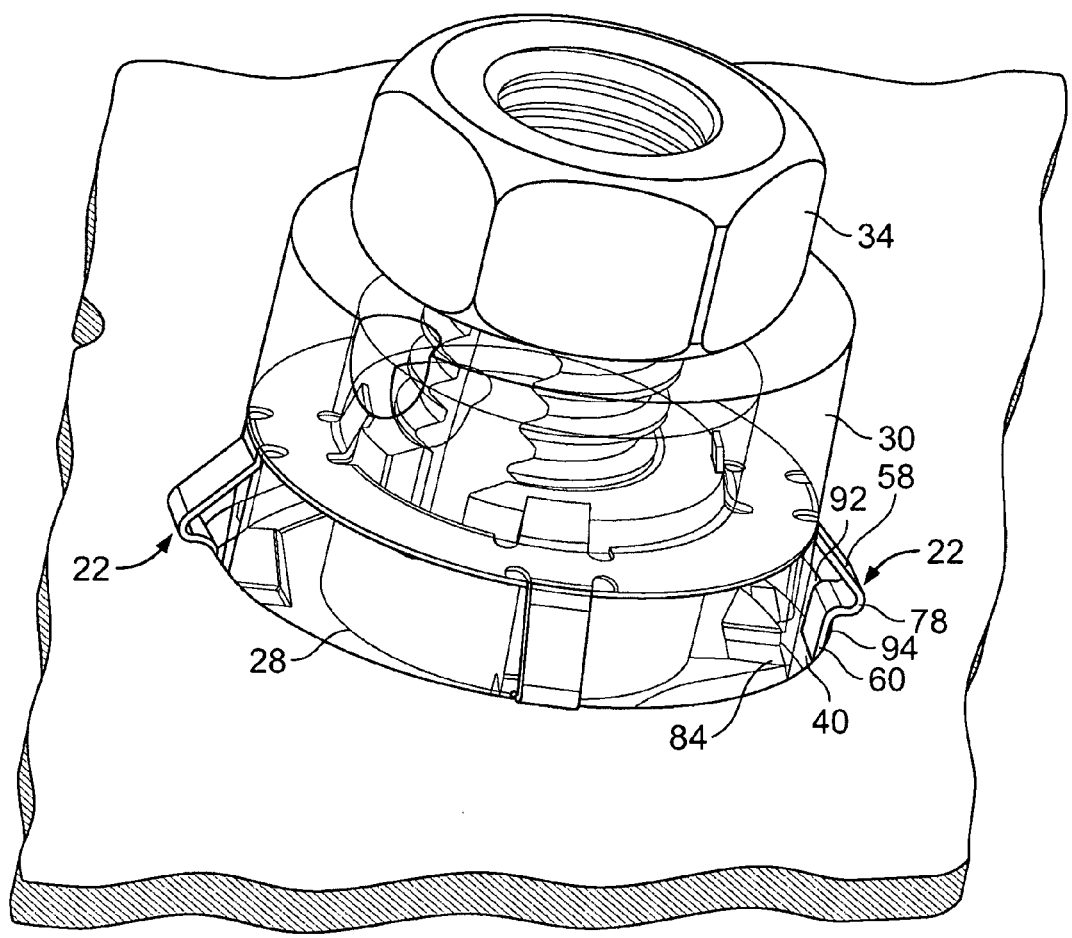
FIG. 11 is a perspective view of the attachment assembly of FIGS. 1 and 2 with a compression member and clamp in phantom.

Thus, as shown in FIGS. 10 and 11, the resilient extensions 24 initially engage an inner rim 92 of the opening 40 in a non-tightened or non-compressed state. More particularly, the ninety degree bend between the inwardly extending portion 78 of the upper portion 58 and the lower portion 60 of the resilient extensions 24 defines an engagement portion that engages a top surface of the panel 26 to prevent the attachment assembly 20 from moving back through the opening 40. Additionally, the lower portion 60 is configured having a generally planar face 94 to engage the inner rim 92 of the opening 40 to align the attachment assembly 20 within the opening 40.

Figure 12:
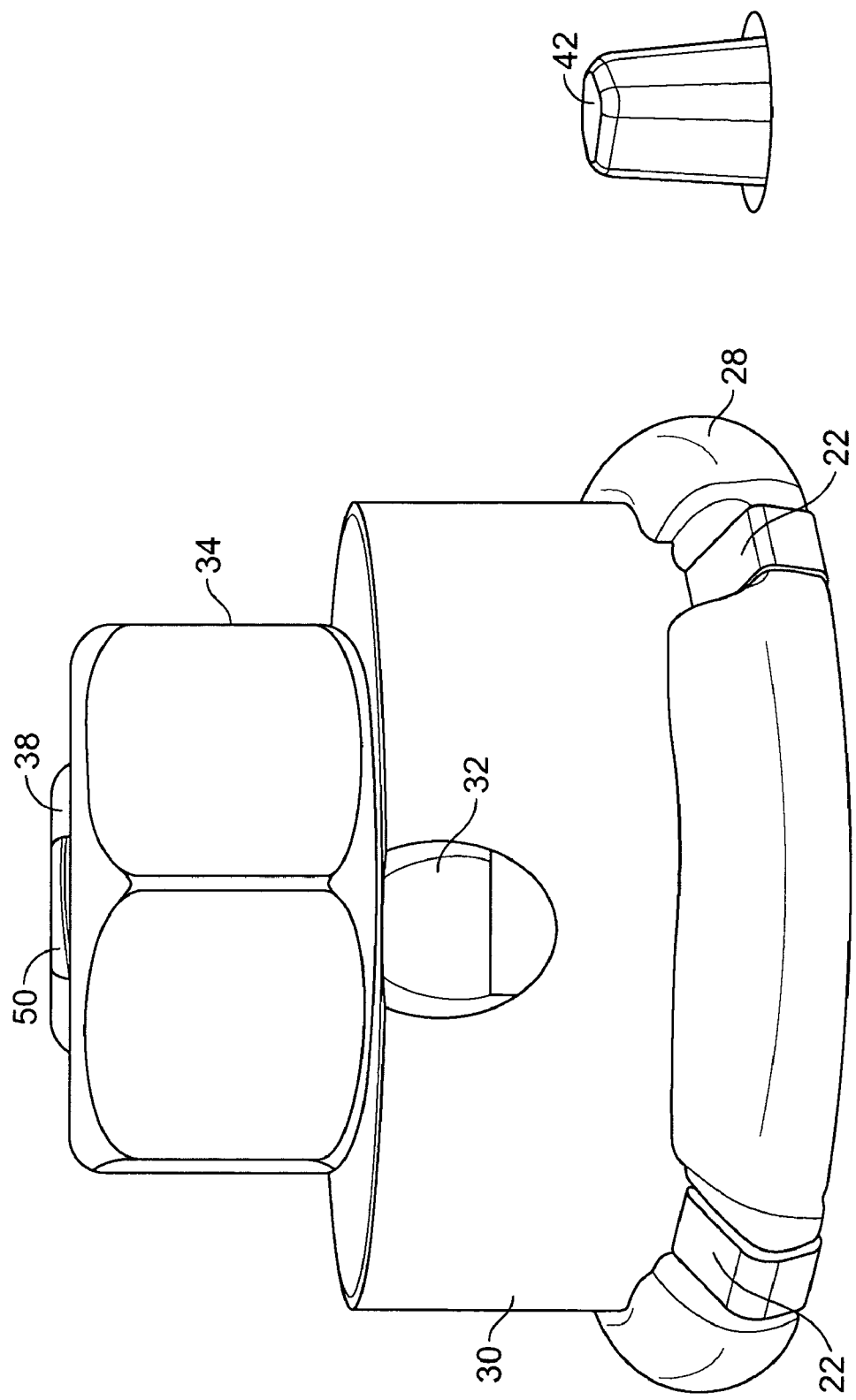
FIG. 12 is a perspective view of the attachment assembly of FIGS. 1 and 2 in a tightened state.

Once the component parts of the attachment assembly 20 are engaged as described above, the nut 34 is tightened as shown in FIG. 12 to compress and deform the compression member 28 to form an engagement with the panel 26 (also referred to as a tightened state). This compression essentially causes the compression member 28 to overlap the panel 26 and prevent the attachment assembly 20 from moving or passing back (e.g., moving backwards) through the panel 26, and in particular, back through the opening 40. During the tightening of the attachment assembly 20, the lower portions 60 of the resilient extensions 24 also are compressed initially into and out of the openings 84 and thereafter expand and apply a force outwardly against the opening 40. This further provides a continuous ground or conductive path.

Thus, various embodiments of the invention provide an assembly for attachment of, for example, a device to a panel, that results in reduced distortion of the panel and reduced angular orientation variations resulting from hole clearances. A plurality of resilient extensions or fingers provide temporary retention and positioning of the object during installation. Additionally, an elastomeric component is provided for centering the mounting, as well as providing an elastomer as the primary attachment material to reduce damage to cables (e.g., reduce crushing of electrical cables during installation). Further, the device provides a positive and continuous ground between the installed object and the surface to which the object is installed, for example, between an antenna assembly and a vehicle.

While the invention has been described in terms of various specific embodiments, those skilled in the art will recognize that the invention can be practiced with modification within the spirit and scope of the claims.

What is claimed is:

1. An attachment assembly comprising:
   a base having a shaft extending therefrom;
   a non-conductive compression member having a plurality of slots and configured to engage the shaft; and
   a locking component configured to engage the shaft, the locking component having a plurality of resilient extensions configured to engage the plurality of slots of the compression member, the locking component configured to compress the compression member in a tightened state and wherein the resilient extensions form a conductive path when in the tightened state and the base comprises a mounting portion having a plurality of recessed regions configured to receive therein a portion of the resilient extensions.

2. An attachment assembly in accordance with claim 1 wherein the shaft comprises a slot along a longitudinal outer surface of the shaft.

3. An attachment assembly in accordance with claim 1 wherein the locking component comprises tabs configured to engage indents of a mounting portion of the base.

4. An attachment assembly in accordance with claim 1 further comprising a clamp configured to engage the locking component and having an opening configured to be aligned with a slot of the shaft.

5. An attachment assembly in accordance with claim 1 wherein the resilient extensions are configured in a non-tightened state to maintain the position of the base relative to a panel to which the base is to be attached.

6. An attachment assembly in accordance with claim 1 wherein the resilient extensions are configured in a non-tightened state to resist backward movement of the base relative to a panel to which the base is to be attached.

7. An attachment assembly in accordance with claim 1 wherein the non-conductive compression member comprises an elastomer.

8. An attachment assembly in accordance with claim 1 wherein the compression member is configured to overlap a panel to which the base is to be attached in the tightened state.

9. An attachment assembly in accordance with claim 1 wherein the base comprises a mounting portion having a plurality of recessed regions and wherein the plurality of slots of the non-conductive compression member are configured in combination with the plurality of recessed portions to form openings to receive therein a lower portion of the plurality of resilient extensions.

10. An attachment assembly in accordance with claim 1 wherein the plurality of resilient extensions comprise a ninety degree bend to define a surface for engagement to a panel to which the base is to be attached when in a non-tightened state.

11. An attachment assembly in accordance with claim 1 wherein the base further comprises a post configured to resist rotation of the base relative to a panel to which the base is to be attached.

12. An attachment assembly in accordance with claim 1 wherein the resilient extensions are configured to resist a force applied to the non-conductive compression member.

13. An attachment assembly comprising:
   a base having a shaft extending therefrom;
   a non-conductive compression member having a plurality of slots and configured to engage the shaft;
   a locking component configured to engage the shaft, the locking component having a plurality of resilient extensions configured to engage the plurality of slots of the compression member, the locking component configured to compress the compression member in a tightened state and wherein the resilient extensions form a conductive path when in the tightened state and
   wherein the shaft comprises a slot and the non-conductive compression member comprises a flange configured to engage the slot.

14. An attachment assembly in accordance with claim 13 wherein the resilient extensions are configured in a non-tightened state to maintain the position of the base relative to a panel to which the base is to be attached.

15. An attachment assembly in accordance with claim 13 wherein the non-conductive compression member is configured to overlap a panel to which the base is to be attached in the tightened state.

16. An attachment assembly in accordance with claim 13 wherein the resilient extensions are configured in a non-tightened state to resist backward movement of the base relative to a panel to which the base is to be attached.

17. An attachment assembly comprising:
a base having a shaft extending therefrom;
a non-conductive compression member having a plurality of slots and configured to engage the shaft;
a locking component configured to engage the shaft, the locking component having a plurality of resilient extensions configured to engage the plurality of slots of the compression member, the locking component configured to compress the compression member in a tightened state and wherein the resilient extensions form a conductive path when in the tightened state; and
a clamp configured to engage the locking component and having an internal tab configured to be aligned with a slot of the shaft.

18. An attachment assembly in accordance with claim 17 wherein the resilient extensions are configured in a non-tightened state to maintain the position of the base relative to a panel to which the base is to be attached.

19. An attachment assembly in accordance with claim 17 wherein the non-conductive compression member is configured to overlap a panel to which the base is to be attached in the tightened state.

20. An attachment assembly in accordance with claim 17 wherein the resilient extensions are configured in a non-tightened state to resist backward movement of the base relative to a panel to which the base is to be attached.

* * * * *